(12) United States Patent
Kashiwagi et al.

(10) Patent No.: US 9,442,302 B2
(45) Date of Patent: Sep. 13, 2016

(54) LIQUID CRYSTAL LENS DEVICE AND IMAGE DISPLAY DEVICE

(71) Applicant: KABUSHIKI KAISHA TOSHIBA, Tokyo (JP)

(72) Inventors: Masako Kashiwagi, Kanagawa (JP); Shinichi Uehara, Tokyo (JP); Ayako Takagi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/703,975

(22) Filed: May 5, 2015

(65) Prior Publication Data

US 2016/0011431 A1 Jan. 14, 2016

(30) Foreign Application Priority Data

Jul. 9, 2014 (JP) .................... 2014-141752

(51) Int. Cl.
*G02F 1/1343* (2006.01)
*G02B 27/26* (2006.01)

(52) U.S. Cl.
CPC ......... *G02B 27/26* (2013.01); *G02F 1/134336* (2013.01); *G02F 1/134363* (2013.01); *G02F 2001/134345* (2013.01); *G02F 2001/134381* (2013.01)

(58) Field of Classification Search
CPC ............. G02F 1/134363; G02F 2001/134381; G02B 27/2214; G02B 27/02
See application file for complete search history.

(56) References Cited

U.S. PATENT DOCUMENTS

| | | | |
|---|---|---|---|
| 2007/0195410 A1 | 8/2007 | Yun et al. | |
| 2010/0238276 A1 | 9/2010 | Takagi et al. | |
| 2012/0069255 A1 | 3/2012 | Takagi et al. | |
| 2012/0162550 A1* | 6/2012 | Jeong ................. | H04N 13/0404 349/15 |

FOREIGN PATENT DOCUMENTS

| | | |
|---|---|---|
| JP | 2007-226231 | 9/2007 |
| JP | 2010-224191 | 10/2010 |
| JP | 2013-218113 | 10/2013 |
| WO | WO 2011/036736 | 3/2011 |

* cited by examiner

*Primary Examiner* — Phu Vu

(74) *Attorney, Agent, or Firm* — Finnegan, Henderson, Farabow, Garrett & Dunner LLP

(57) ABSTRACT

A liquid crystal lens device includes first electrodes, first and second sub electrodes, an opposite electrode, and a liquid crystal layer. The first electrodes extend in a first direction and are arranged in a second direction crossing the first direction. The first sub electrode is provided between a center in the second direction of two nearest ones of the first electrodes and one of the two nearest first electrodes. The second sub electrode is provided between the center and the other of the two nearest first electrodes. The opposite electrode is opposed to each of the first electrodes, the first sub electrode, and the second sub electrode. The liquid crystal layer is provided between the first electrodes and the opposite electrode, between the first sub electrode and the opposite electrode, and between the second sub electrode and the opposite electrode.

20 Claims, 5 Drawing Sheets

LIQUID CRYSTAL LENS DEVICE AND IMAGE DISPLAY DEVICE

CROSS-REFERENCE TO RELATED APPLICATIONS

This application is based upon and claims the benefit of priority from Japanese Patent Application No. 2014-141752, filed on Jul. 9, 2014; the entire contents of which are incorporated herein by reference.

FIELD

Embodiments described herein relate generally to a liquid crystal lens device and an image display device.

BACKGROUND

There is known a liquid crystal lens device utilizing birefringence of liquid crystal molecules to change the distribution of refractive index in response to voltage application. There is known an image display device including the liquid crystal lens device combined with an image display unit. In this image display device, the distribution of refractive index of the liquid crystal optical element is changed to switch between two states. In the first state, the image displayed on the image display unit is made directly incident on the observer's eye. In the second state, the image displayed on the image display unit is made incident on the observer's eye as a plurality of parallax images. This realizes a two-dimensional image display operation and a three-dimensional image display operation. High display quality is desired in such an image display device. A high quality lens function is desired in the liquid crystal lens device.

DETAILED DESCRIPTION

Figure 1:
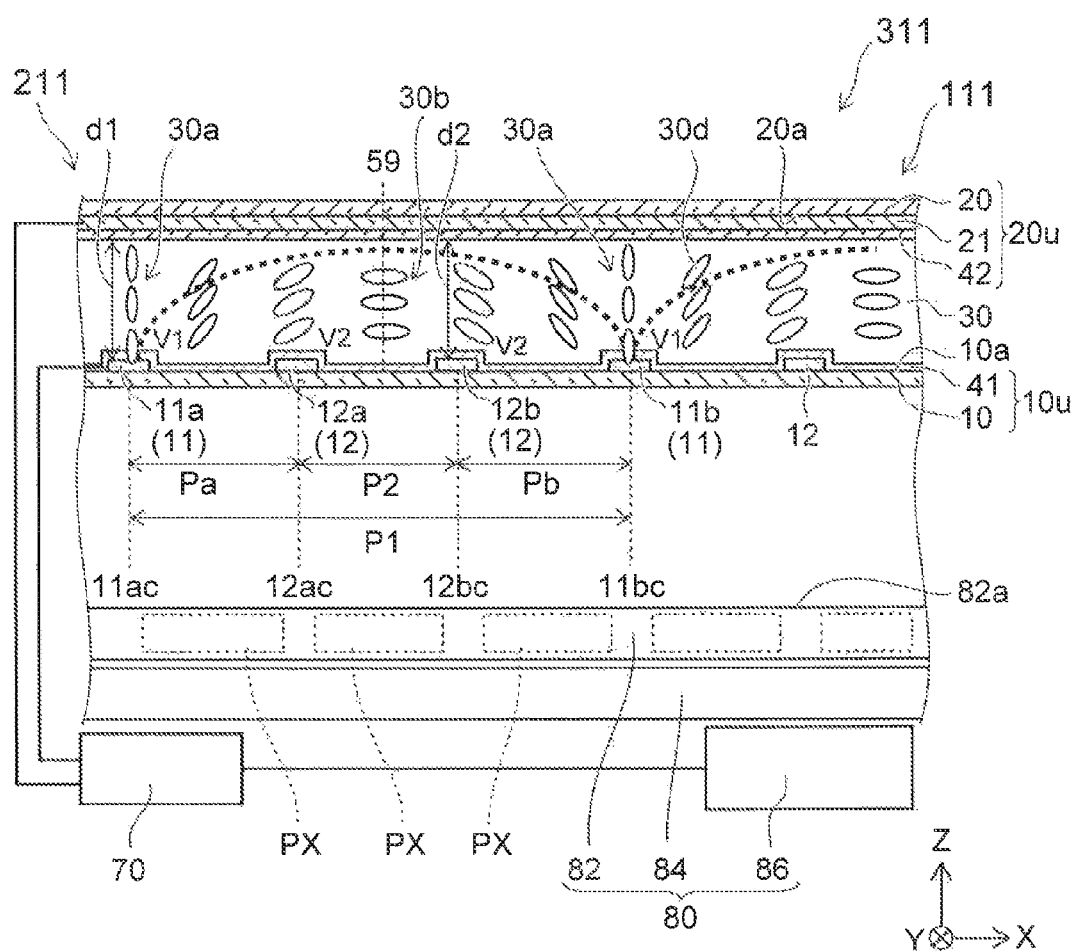
FIG. 1 is a sectional view schematically showing an image display device according to a first embodiment.

According to one embodiment, a liquid crystal lens device includes a plurality of first electrodes, a first sub electrode, a second sub electrode, an opposite electrode, and a liquid crystal layer. The first electrodes extend in a first direction and are arranged in a second direction crossing the first direction. The first sub electrode is provided between a center in the second direction of two nearest ones of the first electrodes and one of the two nearest first electrodes. The second sub electrode is provided between the center and the other of the two nearest first electrodes. The opposite electrode is opposed to each of the first electrodes, the first sub electrode, and the second sub electrode. The liquid crystal layer is provided between the first electrodes and the opposite electrode, between the first sub electrode and the opposite electrode, and between the second sub electrode and the opposite electrode. A distance between the one of the two nearest first electrodes and the first sub electrode and a distance between the other of the two nearest first electrodes and the second sub electrode are longer than a distance between each of the first electrodes and the opposite electrode. V2/V1 is less than or equal to P2/P1. V1 is an absolute value of a potential difference between each of the first electrodes and the opposite electrode. V2 is an absolute value of a potential difference between the first sub electrode and the opposite electrode and between the second sub electrode and the opposite electrode. P1 is a distance between the two nearest first electrodes. P2 is a distance between the first sub electrode and the second sub electrode.

According to another embodiment, an image display device includes a liquid crystal lens device and an image display unit. The liquid crystal lens device includes a plurality of first electrodes, a first sub electrode, a second sub electrode, an opposite electrode, and a liquid crystal layer. The first electrodes extend in a first direction and are arranged in a second direction crossing the first direction. The first sub electrode is provided between a center in the second direction of two nearest ones of the first electrodes and one of the two nearest first electrodes. The second sub electrode is provided between the center and the other of the two nearest first electrodes. The opposite electrode is opposed to each of the first electrodes, the first sub electrode, and the second sub electrode. The liquid crystal layer is provided between the first electrodes and the opposite electrode, between the first sub electrode and the opposite electrode, and between the second sub electrode and the opposite electrode. The image display unit is stacked with the liquid crystal lens device in a third direction crossing the first direction and the second direction and includes a display unit configured to output a light including image information. A distance between the one of the two nearest first electrodes and the first sub electrode and a distance between the other of the two nearest first electrodes and the second sub electrode are longer than a distance between each of the first electrodes and the opposite electrode. V2/V1 is less than or equal to P2/P1. V1 is an absolute value of a potential difference between each of the first electrodes and the opposite electrode. V2 is an absolute value of a potential difference between the first sub electrode and the opposite electrode and between the second sub electrode and the opposite electrode. P1 is a distance between the two nearest first electrodes. P2 is a distance between the first sub electrode and the second sub electrode.

Various embodiments will be described hereinafter with reference to the accompanying drawings.

The drawings are schematic or conceptual. The relationship between the thickness and the width of each portion, and the size ratio between the portions, for instance, are not necessarily identical to those in reality. Furthermore, the same portion may be shown with different dimensions or ratios depending on the figures.

In this specification and the drawings, components similar to those described previously with reference to earlier figures are labeled with like reference numerals, and the detailed description thereof is omitted appropriately.

First Embodiment

FIG. 1 is a sectional view schematically showing an image display device according to a first embodiment.

As shown in FIG. 1, the image display device 311 according to this embodiment includes a liquid crystal lens device 211 and an image display unit 80. The image display unit 80 displays an image. The image display unit 80 can be an arbitrary display device. For instance, the image display unit 80 can be e.g. a liquid crystal display device, an organic EL display device, or a plasma display.

The liquid crystal lens device 211 includes a liquid crystal optical element 111 and a driver 70. For instance, the liquid crystal optical element 111 is provided on the image display unit 80. The liquid crystal optical element 111 functions as e.g. a liquid crystal GRIN lens (gradient index lens). The distribution of refractive index of the liquid crystal optical element 111 is variable. One state of the distribution of refractive index corresponds to a first state in which the image displayed on the image display unit 80 is made directly incident on the observer's eye. Another state of the refractive index distribution corresponds to a second state in which the image displayed on the image display unit 80 is made incident on the observer's eye as a plurality of parallax images.

In the image display device 311, a two-dimensional image display (hereinafter referred to as 2D display) and a three-dimensional image display (hereinafter referred to as 3D display) can be selectively switched by changing the distribution of refractive index of the liquid crystal optical element 111. The 3D display enables stereovision to the naked eye.

The driver 70 is electrically connected to the liquid crystal optical element 111. The driver 70 performs e.g. switching between the first state and the second state of the liquid crystal optical element 111. The driver 70 switches the liquid crystal optical element 111 to the first state when performing 2D display. The driver 70 switches the liquid crystal optical element 111 to the second state when performing 3D display.

The image display unit 80 is inputted with an image signal (video signal) by e.g. a recording medium or external input. The image display unit 80 displays an image corresponding to the inputted image signal. The image display unit 80 displays an image for 2D display when performing 2D display. The image display unit 80 displays an image for 3D display when performing 3D display.

The liquid crystal optical element 111 includes a first substrate unit $10u$, a second substrate unit $20u$, and a liquid crystal layer 30. The first substrate unit $10u$ includes a first substrate 10, a plurality of first electrodes 11, and a plurality of second electrodes 12. The first substrate 10 has a first major surface $10a$. The plurality of first electrodes 11 are provided on the first major surface $10a$. Each of the plurality of first electrodes 11 extends in a first direction. The plurality of first electrodes 11 are arranged in a second direction crossing the first direction. FIG. 1 shows two of the plurality of first electrodes 11. The number of the plurality of first electrodes 11 is arbitrary.

The first direction is referred to as Y-axis direction. The direction parallel to the first major surface $10a$ and perpendicular to the Y-axis direction is referred to as X-axis direction. The direction perpendicular to the X-axis direction and the Y-axis direction is referred to as Z-axis direction. The plurality of first electrodes 11 are arranged in e.g. the X-axis direction. In this example, the second direction is the X-axis direction. The second direction is not limited to the X-axis direction, but may be an arbitrary direction crossing the first direction.

Consider two nearest first electrodes 11 of the plurality of first electrodes 11. One electrode of the two nearest first electrodes 11 is referred to as first main electrode $11a$. The other electrode of the two nearest first electrodes 11 is referred to as second main electrode $11b$.

A central axis 59 exists between the two nearest first electrodes 11 (first main electrode $11a$ and second main electrode $11b$). As projected on the X-Y plane (the plane parallel to the first major surface $10a$), the central axis 59 passes through the midpoint of the line segment connecting the center $11ac$ in the X-axis direction of the first main electrode $11a$ and the center $11bc$ in the X-axis direction of the second main electrode $11b$, and is parallel to the Y-axis direction.

The plurality of second electrodes 12 are respectively provided between the plurality of first electrodes 11 on the first substrate 10. The plurality of second electrodes 12 extend in the Y-axis direction. The plurality of second electrodes 12 are respectively spaced from the plurality of first electrodes 11 in the X-axis direction.

The plurality of second electrodes 12 include a first sub electrode $12a$ and a second sub electrode $12b$. The first sub electrode $12a$ is placed between the center (central axis 59) in the X-axis direction of the two nearest first electrodes 11 and the first main electrode $11a$. The second sub electrode $12b$ is placed between the central axis 59 and the second main electrode $11b$.

The first sub electrode $12a$ of the plurality of second electrodes 12 is provided on the first main electrode $11a$ side on the first major surface $10a$ and extends in the Y-axis direction. The second sub electrode $12b$ of the plurality of second electrodes 12 is provided on the second main electrode $11b$ side on the first major surface $10a$ and extends in the Y-axis direction.

The second substrate unit $20u$ includes a second substrate 20 and an opposite electrode 21. The second substrate 20 has a second major surface $20a$ opposed to the first major surface $10a$. The plurality of first electrodes 11 and the plurality of second electrodes 12 are each provided between the first substrate 10 and the second substrate 20.

The opposite electrode 21 is provided between the first substrate unit $10u$ and the second substrate 20. In other words, the opposite electrode 21 is provided on the second major surface $20a$. The opposite electrode 21 is opposed to each of the plurality of first electrodes 11 and the plurality of second electrodes 12.

The first substrate 10, the first electrode 11, the second electrode 12, the second substrate 20, and the opposite electrode 21 are transmissive to light. Specifically, they are transparent.

The first substrate 10 and the second substrate 20 are made of e.g. a transparent material such as glass or resin. The first substrate 10 and the second substrate 20 are shaped like a plate or sheet. The thickness of the first substrate 10 and the second substrate 20 is e.g. 50 micrometers (μm) or more and 2000 μm or less. However, the thickness is arbitrary.

The first electrode 11, the second electrode 12, and the opposite electrode 21 include e.g. an oxide including at least one (kind of) element selected from the group consisting of In, Sn, Zn, and Ti. These electrodes are made of e.g. ITO. These electrodes may be made of e.g. at least one of $In_2O_3$ and $SnO_3$. The thickness of these electrodes is e.g. approximately 200 nanometers (nm) (e.g., 100 nm or more and 350 nm or less). The thickness of each electrode is set to e.g. a thickness such as to achieve high transmissivity to visible light.

The arrangement pitch of the first electrodes 11 (the distance between the centers in the X-axis direction of the two nearest first electrodes 11) is e.g. 50 μm or more and 1000 μm or less. The arrangement pitch is set in conformity with the desired specification (the characteristics of the gradient index lens described later). The length (width) along the X-axis direction of the first electrode 11 and the second electrode 12 is e.g. 5 µm or more and 300 µm or less.

The liquid crystal layer 30 is provided between the first substrate unit 10u and the second substrate unit 20u. The liquid crystal layer 30 is provided between the plurality of first electrodes 11 and the opposite electrode 21 and between the plurality of second electrodes 12 and the opposite electrode 21. The liquid crystal layer 30 includes a liquid crystal material. The liquid crystal material is a nematic liquid crystal (in a nematic phase at the operating temperature of the liquid crystal optical element 111). The liquid crystal material has positive dielectric anisotropy or negative dielectric anisotropy. In the case of positive dielectric anisotropy, the initial arrangement of the liquid crystal in the liquid crystal layer 30 (the arrangement under no voltage application to the liquid crystal layer 30) is e.g. horizontally oriented. In the case of negative dielectric anisotropy, the initial arrangement of the liquid crystal in the liquid crystal layer 30 is e.g. vertically oriented.

The length (thickness) of the liquid crystal layer 30 along the Z-axis direction is e.g. 10 µm or more and 50 µm or less. In this example, the thickness of the liquid crystal layer 30 is 40 µm. That is, the thickness of the liquid crystal layer 30 is the distance along the Z-axis direction between the first substrate unit 10u and the second substrate unit 20u.

The orientation of the liquid crystal in the liquid crystal layer 30 may have a pretilt. In the pretilt, for instance, the director 30d of the liquid crystal is directed from the first substrate unit 10u to the second substrate unit 20u with the distance in the +X-direction from the first main electrode 11a to the second main electrode 11b.

The pretilt angle is the angle between the director 30d (the axis in the long axis direction of the liquid crystal molecule) of the liquid crystal and the X-Y plane. In the case of horizontal orientation, the pretilt angle is e.g. more than 0° and less than 45°. In the case of vertical orientation, the pretilt angle is e.g. more than 45° and less than 90°.

In this specification, for convenience, the case of the pretilt angle less than 45° is referred to as horizontal orientation. The case of the pretilt angle more than 45° is referred to as vertical orientation.

The direction of pretilt can be determined by e.g. crystal rotation technique. The direction of pretilt can be determined also by observing the optical characteristics of the liquid crystal layer 30 when the orientation of the liquid crystal is changed by applying voltage to the liquid crystal layer 30.

The first substrate unit 10u may be subjected to orientation treatment such as rubbing. In this case, the direction of orientation treatment is directed along the +X-direction. In this example, the direction of orientation treatment in the first substrate unit 10u is e.g. the +X-direction.

When the director 30d of the liquid crystal is projected on the X-Y plane, the axis of the director 30d may be parallel or non-parallel to the +X-direction. When the direction of pretilt is projected on the X-axis, the direction of pretilt includes a +X-direction component.

The orientation direction of the liquid crystal layer 30 near the second substrate unit 20u is antiparallel to the orientation direction of the liquid crystal layer 30 near the first substrate unit 10u. In this example, the direction of orientation treatment in the second substrate unit 20u is the −X-direction. That is, the initial orientation is not the spray arrangement.

The first substrate unit 10u further includes a first orientation film 41. The first orientation film 41 is provided between the first substrate 10 and the liquid crystal layer 30.

The plurality of first electrodes 11 and the plurality of second electrodes 12 are provided between the first orientation film 41 and the first substrate 10. The second substrate unit 20u further includes a second orientation film 42. The second orientation film 42 is provided between the second substrate 20 and the liquid crystal layer 30. The opposite electrode 21 is provided between the second orientation film 42 and the second substrate 20. The first orientation film 41 and the second orientation film 42 are made of e.g. polyimide. The initial arrangement of the liquid crystal layer 30 is obtained by performing e.g. rubbing treatment on the first orientation film 41 and the second orientation film 42. The direction of rubbing treatment on the first orientation film 41 is antiparallel to the direction of rubbing treatment on the second orientation film 42. The initial arrangement may be obtained by performing light irradiation treatment on the first orientation film 41 and the second orientation film 42.

The thickness of the first orientation film 41 and the second orientation film 42 is e.g. 100 nm (e.g., 30 nm or more and 300 nm or less). The distance in the Z-axis direction between each of the plurality of first electrodes 11 and the liquid crystal layer 30 is e.g. 30 nm or more and 300 nm or less. The distance in the Z-axis direction between each of the plurality of second electrodes 12 and the liquid crystal layer 30 is e.g. 30 nm or more and 300 nm or less.

The following description is described with reference to the case where the liquid crystal included in the liquid crystal layer 30 has positive dielectric anisotropy and the initial arrangement is horizontally oriented.

A voltage is applied between the first electrode 11 and the opposite electrode 21 and between the second electrode 12 and the opposite electrode 21. Thus, an electric field acts on the liquid crystal molecules in the liquid crystal layer 30 and changes the liquid crystal orientation. In response to this change, a refractive index distribution is formed in the liquid crystal layer 30. This refractive index distribution changes the traveling direction of light incident on the liquid crystal optical element 111. This change of the traveling direction of light is primarily based on the refraction effect.

The image display unit 80 includes a display unit 82 and a light source unit 84. The display unit 82 and the light source unit 84 are stacked with the liquid crystal optical element 111. The display unit 82 and the light source unit 84 are stacked with the liquid crystal lens device 211 (liquid crystal optical element 111) in a third direction crossing the first direction and the second direction. The third direction is e.g. the Z-axis direction. The third direction is not limited to the Z-axis direction, but may be an arbitrary direction crossing the first direction and the second direction. In this example, the display unit 82 is provided between the liquid crystal optical element 111 and the light source unit 84. The light source unit 84 emits light toward the display unit 82. The display unit 82 transmits the incident light and outputs light including image information. That is, in this example, the display unit 82 is a display device of the transmission type. The light source unit 84 is what is called a back light. The display unit 82 injects the light including image information into the liquid crystal optical element 111. The light source unit 84 can be omitted in the case where the display unit 82 is e.g. a display device of the self-emission type such as an organic EL display device.

The image display unit 80 can further include a display controller 86 for controlling the display unit 82. The display unit 82 generates modulated light based on the signal supplied from the display controller 86. The display unit 82 outputs e.g. light including a plurality of parallax images.

The driver 70 may be connected to the display controller 86 by a wired or wireless method (such as an electrical method or optical method). The image display device 311 may further include a controller (not shown) for controlling the driver 70 and the display controller 86.

The display unit 82 has a display surface 82a. The display unit 82 outputs light including image information from the display surface 82a. The display surface 82a is shaped like e.g. a rectangle. The liquid crystal optical element 111 is provided on the display surface 82a. The length in the Y-axis direction of the first electrode 11 is slightly longer than the length in the Y-axis direction of the display surface 82a. The first electrode 11 traverses the display surface 82a in the Y-axis direction.

The display unit 82 includes a plurality of pixels PX arranged in a two-dimensional matrix. The plurality of pixels PX are arranged in the X-axis direction and the Y-axis direction. The display surface 82a is formed from the plurality of pixels PX.

The region between the two nearest first electrodes 11 is opposed to a plurality of pixels PX arranged in the X-axis direction. In the Z-axis direction, the region between the two nearest first electrodes 11 overlaps a plurality of pixels PX arranged in the X-axis direction. In this example, the region between the two nearest first electrodes 11 is opposed to three pixels PX arranged in the X-axis direction. That is, the spacing of the plurality of first electrodes 11 is wider than the spacing in the X-axis direction of the plurality of pixels PX. The number of the plurality of pixels PX opposed to the region between the two nearest first electrodes 11 and arranged in the X-axis direction is not limited to three, but may be two, or four or more.

The display unit 82 outputs e.g. light including an image to be displayed on the display surface 82a. This light is linearly polarized light traveling substantially in the Z-axis direction. The polarization axis (azimuth axis of the electric field oscillation plane in the X-Y plane) of this linearly polarized light is in the X-axis direction. That is, the polarization axis of this linearly polarized light is directed parallel to the director (long axis) of the liquid crystal molecule. This linearly polarized light is formed by e.g. placing an optical filter (polarizer) on the optical path. The polarization axis of the optical filter is in the X-axis direction.

The driver 70 is electrically connected to each of the plurality of first electrodes 11, the plurality of second electrodes 12, and the opposite electrode 21. For clarity of illustration, FIG. 1 omits the illustration of part of the wiring between the driver 70 and the first electrode 11 and the illustration of the wiring between the driver 70 and the second electrode 12.

Each of the plurality of liquid crystal molecules included in the liquid crystal layer 30 is horizontally oriented when no voltage is applied between the plurality of first electrodes 11 and the opposite electrode 21 and between the plurality of second electrodes 12 and the opposite electrode 21. Thus, a nearly uniform refractive index distribution is exhibited in the X-axis direction and the Y-axis direction. Accordingly, the traveling direction of light including the image displayed in the display unit 82 is not substantially changed when no voltage is applied. That is, the liquid crystal optical element 111 is in the first state when no voltage is applied.

The driver 70 sets a potential to each of the plurality of first electrodes 11, the plurality of second electrodes 12, and the opposite electrode 21 when switching the liquid crystal optical element 111 from the first state to the second state. The driver 70 sets the absolute value of the potential difference between each of the plurality of first electrodes 11 and the opposite electrode 21 to V1. In other words, V1 is the absolute value of the voltage between each of the plurality of first electrodes 11 and the opposite electrode 21. In the following, for convenience, the aforementioned absolute value of the voltage is referred to as first voltage V1. The driver 70 applies the first voltage V1 between each of the plurality of first electrodes 11 and the opposite electrode 21.

The driver 70 sets the absolute value of the potential difference between each of the plurality of second electrodes 12 and the opposite electrode 21 to V2. In other words, V2 is the absolute value of the voltage between each of the plurality of second electrodes 12 and the opposite electrode 21. In the following, for convenience, the aforementioned absolute value of the voltage is referred to as second voltage V2. The driver 70 applies the second voltage V2 between each of the plurality of second electrodes 12 and the opposite electrode 21.

The first voltage V1 is higher than the second voltage V2. Thus, when the first voltage V1 and the second voltage V2 are applied, the tilt angle of the liquid crystal molecules is larger in the first portion 30a of the liquid crystal layer 30 in which the first electrode 11 is opposed to the opposite electrode 21. In the first portion 30a, for instance, the orientation of the liquid crystal molecules is close to vertical orientation. On the other hand, the liquid crystal molecules remain horizontally oriented in the second portion 30b of the liquid crystal layer 30 around the center of the two adjacent first electrodes 11. In the portion between the first portion 30a and the second portion 30b, the angle (tilt angle) of the liquid crystal molecules gradually changes toward vertical orientation from the second portion 30b toward the first portion 30a. The liquid crystal molecules change the angle of the long axis in the Z-X plane. The angle of the long axis of the liquid crystal molecules changes about the Y-axis direction.

The liquid crystal molecule has birefringence. The refractive index in the long axis direction of the liquid crystal molecule to polarized light is higher than the refractive index in the short axis direction of the liquid crystal molecule. The angle of the liquid crystal molecules is changed as described above. Consider the case where linearly polarized light travels in the Z-axis direction, and the polarization axis of the linearly polarized light is directed in the X-axis direction. The refractive index of the liquid crystal layer 30 with respect to this linearly polarized light is high in the second portion 30b of the liquid crystal layer 30, and gradually decreases toward the first portion 30a. Thus, a refractive index distribution shaped like a convex lens (semicircle) is formed.

The plurality of first electrodes 11 extend along the Y-axis direction. Thus, the refractive index distribution of the liquid crystal layer 30 under voltage application is shaped like a cylindrical lens extending along the Y-axis direction. The plurality of first electrodes 11 are arranged in the X-axis direction. Thus, as viewed over the entire liquid crystal layer 30, the refractive index distribution of the liquid crystal layer 30 under voltage application is shaped like a lenticular lens in which a plurality of cylindrical lenses extending along the Y-axis direction are arranged in the X-axis direction.

The polarity of the first voltage V1 and the second voltage V2 may be e.g. periodically changed. For instance, the potential of the opposite electrode 21 may be fixed, and the potential of the first electrode 11 or the potential of the second electrode 12 may be changed in AC mode. Alternatively, the polarity of the potential of the opposite electrode 21 may be periodically changed. In conjunction with this change of polarity, the potential of the first electrode 11 or the potential of the second electrode 12 may be changed in the opposite polarity. That is, common inversion driving may be performed. This can decrease the power supply voltage of the driving circuit. Thus, the breakdown voltage specification of the driving IC is relaxed.

The refractive index distribution formed in the liquid crystal layer 30 and shaped like a convex lens is opposed to a plurality of pixels PX arranged in the X-axis direction of the display unit 82. In this example, the portion (second portion 30b) having higher refractive index in the refractive index distribution of the liquid crystal layer 30 is opposed to the central pixel PX of the three pixels PX arranged in the X-axis direction.

The refractive index distribution of the liquid crystal layer 30 under voltage application causes light (image) outputted from each pixel PX to travel toward the observer's eye. Thus, the image formed by each of the three pixels PX opposed to the refractive index distribution constitutes a parallax image. That is, in this example, the three pixels PX arranged in the X-axis direction form three parallax images. The parallax image for the right eye is selectively incident on the observer's right eye. The parallax image for the left eye is selectively incident on the observer's left eye. This enables 3D display. That is, the liquid crystal optical element 111 is in the second state when a voltage is applied to each of the plurality of first electrodes 11, the plurality of second electrodes 12, and the opposite electrode 21.

When the liquid crystal optical element 111 is in the first state, the light outputted from each pixel PX travels in a straight line and is incident on the observer's eye. This enables 2D display. In 2D display, an ordinary 2D image can be displayed at a resolution multiplied by the number of parallax (in this example, three) relative to 3D display.

The plurality of pixels PX can be provided with color filters each including three RGB primary colors. This enables color display. The color filter may further include white (colorless) or other color elements besides the three RGB primary colors.

Thus, in the liquid crystal optical element 111 of the image display device 311, the refractive index distribution of the liquid crystal layer 30 is changed by applying or not applying voltage to the plurality of first electrodes 11, the plurality of second electrodes 12, and the opposite electrode 21. Accordingly, 2D display and 3D display are switched.

The distance between the first main electrode 11a and the first sub electrode 12a is denoted by Pa. The distance between the second main electrode 11b and the second sub electrode 12b is denoted by Pb. More specifically, the distance Pa is the distance in the X-axis direction between the center 11ac in the X-axis direction of the first main electrode 11a and the center 12ac in the X-axis direction of the first sub electrode 12a. The distance Pb is the distance in the X-axis direction between the center 11bc in the X-axis direction of the second main electrode 11b and the center 12bc in the X-axis direction of the second sub electrode 12b. The distance Pb is substantially equal to the distance Pa.

The distance in the Z-axis direction between the first electrode 11 and the opposite electrode 21 is denoted by d1. The distance in the Z-axis direction between the second electrode 12 and the opposite electrode 21 is denoted by d2. The distance d1 is substantially equal to the distance d2. That is, the thickness of the first electrode 11 is substantially equal to the thickness of the second electrode 12. In other words, the distance d1 and the distance d2 are the thickness of the liquid crystal layer 30 between the respective electrodes.

The distance Pa and the distance Pb are longer than the distance d1 and the distance d2. That is, the distance between the first electrode 11 and the second electrode 12 is longer than the thickness of the liquid crystal layer 30.

The distance between the first main electrode 11a and the second main electrode 11b is denoted by P1. The distance between the first sub electrode 12a and the second sub electrode 12b is denoted by P2. More specifically, the distance P1 is the distance in the X-axis direction between the center 11ac in the X-axis direction of the first main electrode 11a and the center 11bc in the X-axis direction of the second main electrode 11b. The distance P2 is the distance in the X-axis direction between the center 12ac in the X-axis direction of the first sub electrode 12a and the center 12bc in the X-axis direction of the second sub electrode 12b.

In the liquid crystal optical element 111, the distance P1, the distance P2, the first voltage V1, and the second voltage V2 described above satisfy the relation of the following formula (1).

$$V2/V1 \leq P2/P1 \quad (1)$$

That is, the ratio V2/V1 of the second voltage V2 to the first voltage V1 is less than or equal to the ratio P2/P1 of the distance P2 between the second electrodes 12 to the distance P1 between the first electrodes 11.

In the liquid crystal optical element 111, the distance P1 and the distance P2 are set so as to satisfy the relation of formula (1). The driver 70 sets the first voltage V1 and the second voltage V2 so as to satisfy the relation of formula (1). That is, the driver 70 sets the potential of each of the plurality of first electrodes 11, the plurality of second electrodes 12, and the opposite electrode 21 so as to satisfy the relation of formula (1). In formula (1), the distances P1, P2 are expressed in units of µm (micrometers). The first voltage V1 and the second voltage V2 are expressed in units of V (volts).

The distance P2 is e.g. half or less of the distance P1, The distance P1 is e.g. 260 µm (20 µm or more and 1000 µm or less). The distance P2 is e.g. 130 µm (10 µm or more and 500 µm or less). The distance d1 and the distance d2 (the thickness of the liquid crystal layer 30) are e.g. 40 µm (20 µm or more and 50 µm or less). The first voltage V1 is e.g. 5 V (3 V or more and 7 V or less). The second voltage V2 is e.g. 1.2 V (0.5 V or more and 2.5 V or less).

The first voltage V1 applied to the first electrode 11 is higher than the second voltage V2 applied to the second electrode 12. In the liquid crystal layer 30, an effect of strong electric field occurs near the distance D1 (distance comparable to the thickness of the liquid crystal layer 30) in the X-axis direction away from the first electrode 11. If the second electrode 12 is placed in the region in which this strong electric field occurs, the electric field induced by the first electrode 11 strongly interacts with the electric field induced by the second electrode 12. This is likely to disturb the liquid crystal orientation.

Thus, the distance Pa and the distance Pb are made longer than the distance d1 and the distance d2. This can suppress the disturbance of liquid crystal orientation.

Figure 2:
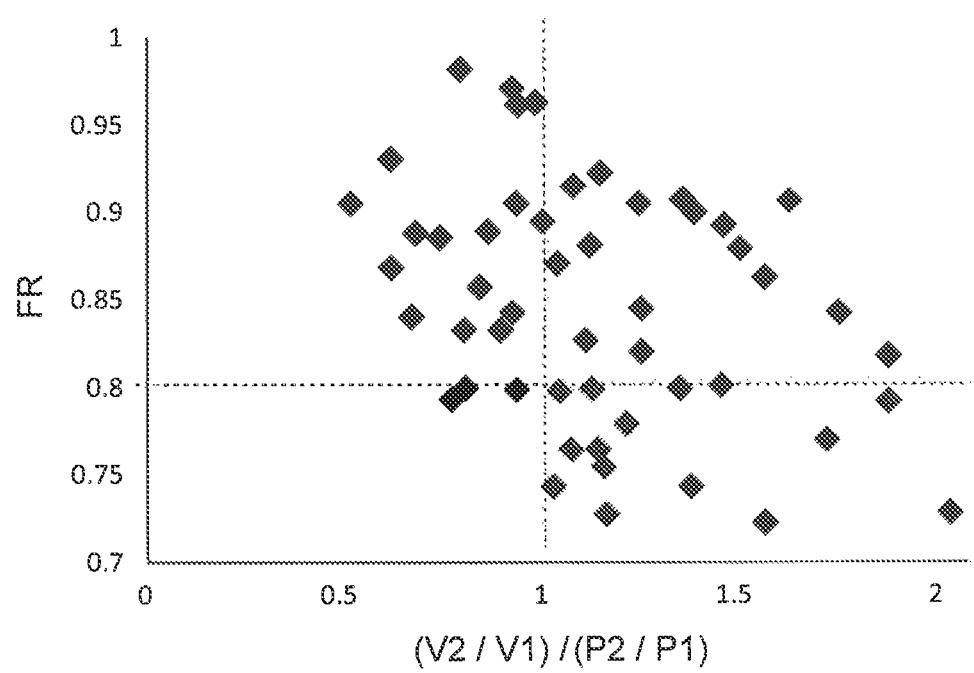
FIG. 2 is a graph schematically showing an example of the characteristics of the liquid crystal lens device according to the first embodiment.

FIG. 2 is a graph schematically showing an example of the characteristics of the liquid crystal lens device according to the first embodiment.

FIG. 2 schematically shows an example of the experimental results. In the experiment, a plurality of samples with different P2/P1 were prepared. For each sample, the focusing ratio FR was measured with V2/V1 changed. The focusing ratio FR refers to the ratio of light focused at an arbitrary focal distance for a light beam incident on one unit of the refractive index distribution shaped like a convex lens of the liquid crystal layer 30. In the case of low focusing ratio FR, only part of the light incident on the refractive index distribution shaped like a convex lens focuses at the focal distance. The rest becomes scattered light or stray light. For instance, the focusing ratio FR can be determined as the ratio between the light intensity of the entire lens incidence surface and the light intensity of the entire focusing surface having an arbitrary area. The light intensity is measured by a luminance meter. The horizontal axis of FIG. 2 represents the ratio (V2/V1)/(P2/P1) of the voltage V1, V2 and the distance P1, P2 set to each sample in the experiment. The vertical axis of FIG. 2 represents the measured focusing ratio FR.

The focusing ratio FR is set to 0.8 or more. This can suppress e.g. scattering of light. Thus, the refractive index distribution of the liquid crystal layer 30 can be appropriately caused to function as a lens. For instance, in 3D display, this can suppress e.g. crosstalk of parallax images and achieve high display quality.

As shown in FIG. 2, if (V2/V1)/(P2/P1) is more than 1, there are more conditions of voltage and electrode position with the focusing ratio FR less than 0.8. Thus, in the case where (V2/V1)/(P2/P1) is more than 1, the lens performance is prone to degradation in response to the variation of voltage and electrode position due to e.g. manufacturing accuracy.

On the other hand, in the case where (V2/V1)/(P2/P1) is 1 or less, the degradation of lens performance can be suppressed even under slight variation of the condition of voltage and electrode position. Furthermore, this can easily achieve high lens performance such that the focusing ratio FR exceeds 0.9. For instance, (V2/V1)/(P2/P1) is set to 0.5 or more and 1 or less. This can achieve good lens performance in the refractive index distribution of the liquid crystal layer 30.

For instance, the distance Pa, Pb is short. The second electrode 12 is placed near the first electrode 11. The application voltage of the second electrode 12 is low. In this case, the horizontally oriented region around the lens center is widened. This causes concern that the lens characteristic is flattened at the center.

For instance, the distance Pa, Pb is short. The second electrode 12 is placed near the first electrode 11. The application voltage of the second electrode 12 is high. In this case, the region close to vertical orientation near the lens edge is widened. This causes concern that the lens characteristic is shaped like a prism.

For instance, the second electrode 12 is placed near the center. The application voltage of the second electrode 12 is high. In this case, there is concern that the lens characteristic is distorted in the portion between the second electrode 12 and the opposite electrode 21.

In the liquid crystal lens device 211 and the image display device 311 according to this embodiment, the distance Pa and the distance Pb are made longer than the distance d1 and the distance d2. The placement and application voltage of each electrode are set so as to satisfy the relation of V2/V1 P2/P1. Thus, for instance, good refractive index distribution shaped like a convex lens can be formed in the liquid crystal layer 30. For instance, this can suppress the decrease of focusing ratio FR. Furthermore, a high quality lens function can be provided. For instance, high quality 3D display can be provided.

In the liquid crystal lens device 211 and the image display device 311, the electrodes placed between the two nearest first electrodes 11 are only two electrodes, i.e., the first sub electrode 12a and the second sub electrode 12b. This can improve manufacturability relative to the case where more electrodes are formed between the two nearest first electrodes 11. Furthermore, the number of applied voltages can be reduced to two, i.e., the first voltage V1 and the second voltage V2. This can simplify e.g. the configuration of the driver 70.

The number of second electrodes 12 placed between the two nearest first electrodes 11 is not limited to two, but may be three or more. Electrodes other than the second electrodes 12 may be further provided between the two nearest first electrodes 11.

Figure 3A:
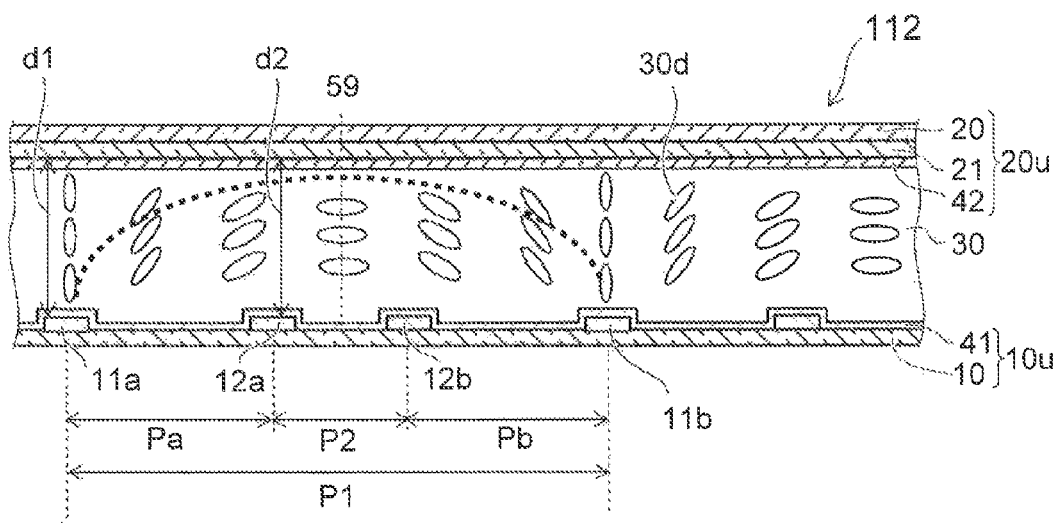
FIGS. 3A and 3B are sectional views schematically showing part of an alternative image display device according to the first embodiment.
Figure 3B:
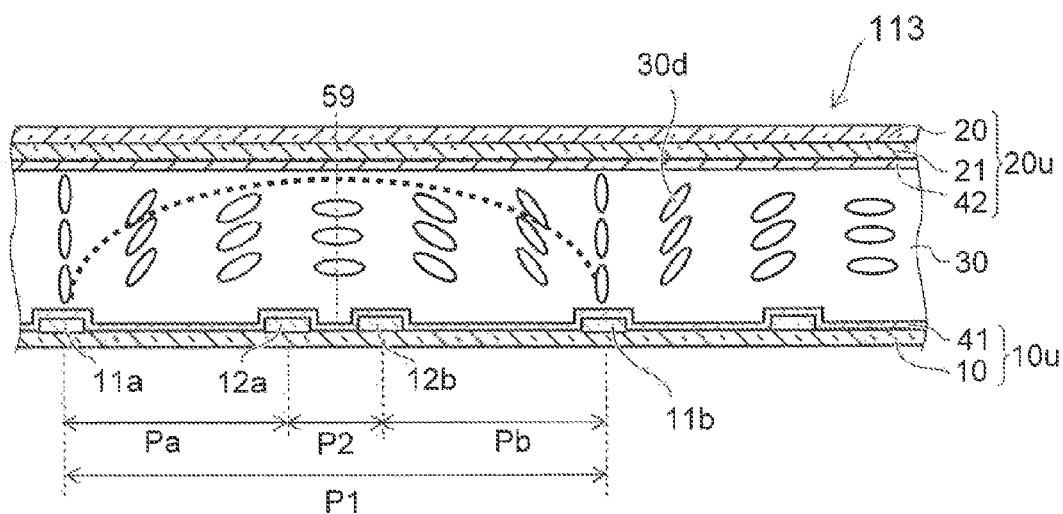

FIGS. 3A and 3B are sectional views schematically showing part of an alternative image display device according to the first embodiment.

FIGS. 3A and 3B show only the liquid crystal optical element 112, 113 for convenience. The driver 70 and the image display unit 80 can be configured similarly to the above embodiment. In the following, the components substantially the same in function or configuration as those of the above embodiment are labeled with like reference numerals, and the detailed description thereof is omitted.

As shown in FIG. 3A, in the liquid crystal optical element 112, the distance P2 in the X-axis direction between the first sub electrode 12a and the second sub electrode 12b is less than or equal to the distance Pa in the X-axis direction between the first main electrode 11a and the first sub electrode 12a, and the distance Pb in the X-axis direction between the second main electrode 11b and the second sub electrode 12b.

In the liquid crystal optical element 112, the distance P2 is e.g. 70 μm. The distance Pa and the distance Pb are e.g. 120 μm. The first voltage V1 is e.g. three times or more the second voltage V2. The first voltage V1 is e.g. 5 V. The second voltage V2 is e.g. 1 V.

Thus, the second electrode 12 is made close to the central axis 59. Accordingly, the electric field induced by the second electrode 12 is applied more easily to the region in which the electric field effect of the first electrode 11 is weaker. Thus, the refractive index distribution shaped like a convex lens is formed more easily. For instance, this can further improve the focusing performance of the refractive index distribution shaped like a convex lens.

The distance P2 in the X-axis direction between the first sub electrode 12a and the second sub electrode 12b is set to half or more of the distance d1 and the distance d2. That is, the distance P2 is set to half or more of the thickness of the liquid crystal layer 30. This can suppress the occurrence of disclination caused by the interaction of electric field between the first sub electrode 12a and the second sub electrode 12b. For instance, the display quality of 3D display can be further enhanced.

As shown in FIG. 3B, in the liquid crystal optical element 113, the distance P2 in the X-axis direction between the first sub electrode 12a and the second sub electrode 12b is a quarter or less of the distance P1 in the X-axis direction between the first main electrode 11a and the second main electrode 11b.

In the liquid crystal optical element 113, the distance P2 is e.g. 60 μm. The distance P1 is e.g. 300 μm. The first voltage V1 is e.g. three times or more the second voltage V2. The first voltage V1 is e.g. 5 V. The second voltage V2 is e.g. 1 V. The distance P2 is half or more of the distance d1 and the distance d2.

Thus, the second electrode 12 is made further close to the central axis 59. Accordingly, the electric field induced by the second electrode 12 is applied still more easily to the region in which the electric field effect of the first electrode 11 is weaker. Thus, the refractive index distribution shaped like a convex lens is formed more easily. For instance, this can further improve the focusing performance of the refractive index distribution shaped like a convex lens.

Second Embodiment

Figure 4:
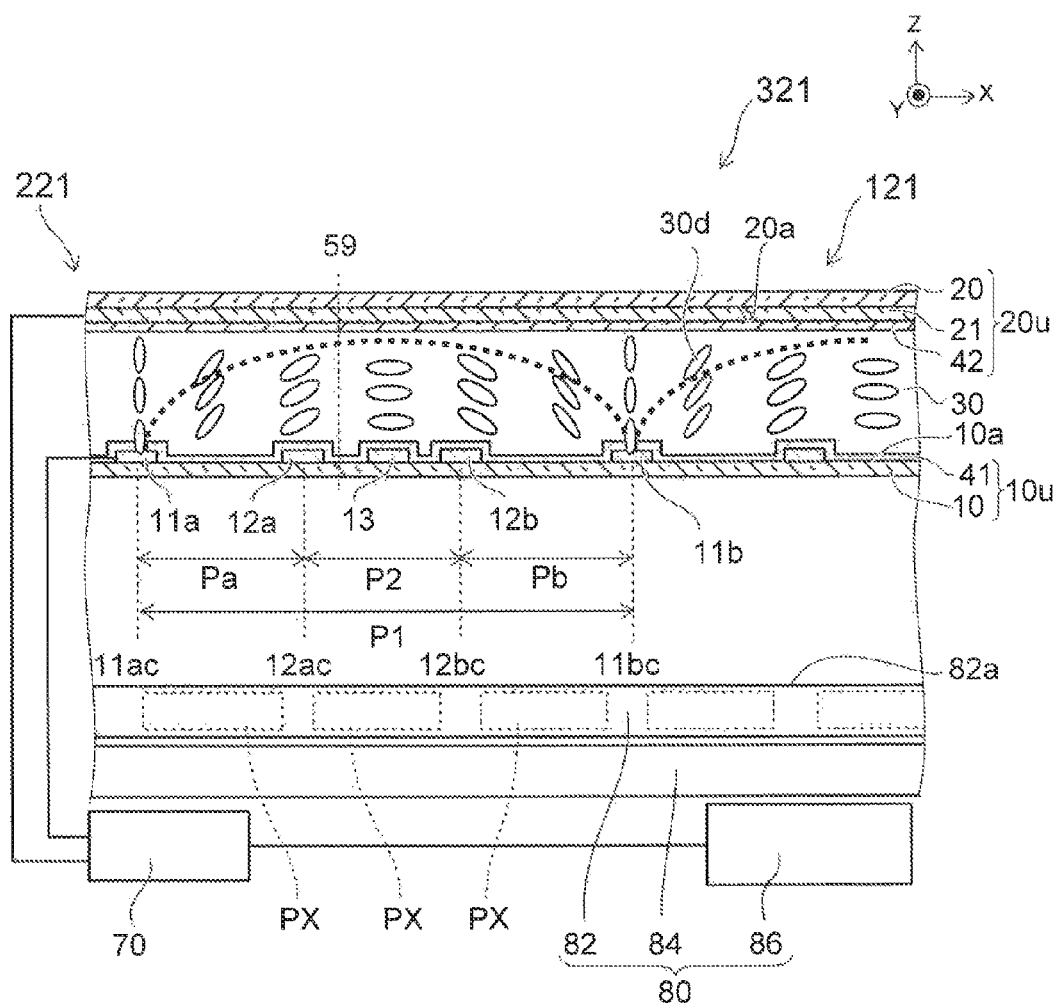
FIG. 4 is a sectional view schematically showing an image display device according to a second embodiment.

FIG. 4 is a sectional view schematically showing an image display device according to a second embodiment.

As shown in FIG. 4, in the image display device 321 and the liquid crystal lens device 221, the first substrate unit 10u of the liquid crystal optical element 121 further includes a central electrode 13. The central electrode 13 is provided on the first major surface 10a. As projected on the plane (X-Y plane) parallel to the X-axis direction and the Y-axis direction, the central electrode 13 overlaps the central axis 59. In other words, the central electrode 13 is placed on the central axis 59 between the two nearest first electrodes 11. The central electrode 13 is provided between the first sub electrode 12a and the second sub electrode 12b. The central electrode 13 is spaced from the first sub electrode 12a and the second sub electrode 12b. The central electrode 13 is light transmissive. The central electrode 13 is e.g. transparent. The central electrode 13 can be made of e.g. the material described with reference to the first electrode 11 and the second electrode 12.

The central electrode 13 is electrically connected to the driver 70. The driver 70 places the central electrode 13 at e.g. substantially the same potential as that of the opposite electrode 21. That is, the driver 70 sets the voltage between the central electrode 13 and the opposite electrode 21 to substantially 0 V. The driver 70 applies a third voltage V3 between the central electrode 13 and the opposite electrode 21. The third voltage V3 is substantially 0 V.

Thus, in the liquid crystal lens device 221 and the image display device 321, the central electrode 13 is further provided on the first substrate unit 10u. This can improve e.g. the flexibility of adjusting the shape of refractive index distribution around the lens center. For instance, the lens performance (focusing ratio FR) can be further improved. The central electrode 13 is placed at substantially the same potential as the opposite electrode 21. For instance, this eliminates the need of preparing a new voltage in the driver 70. For instance, the complication of the driver 70 can be suppressed even in the case of providing the central electrode 13. In the case of providing the central electrode 13, the electrodes placed between the two nearest first electrodes 11 are only three electrodes, i.e., the first sub electrode 12a, the second sub electrode 12b, and the central electrode 13. This can suppress the decrease of manufacturability of the liquid crystal lens device 221.

Third Embodiment

Figure 5:
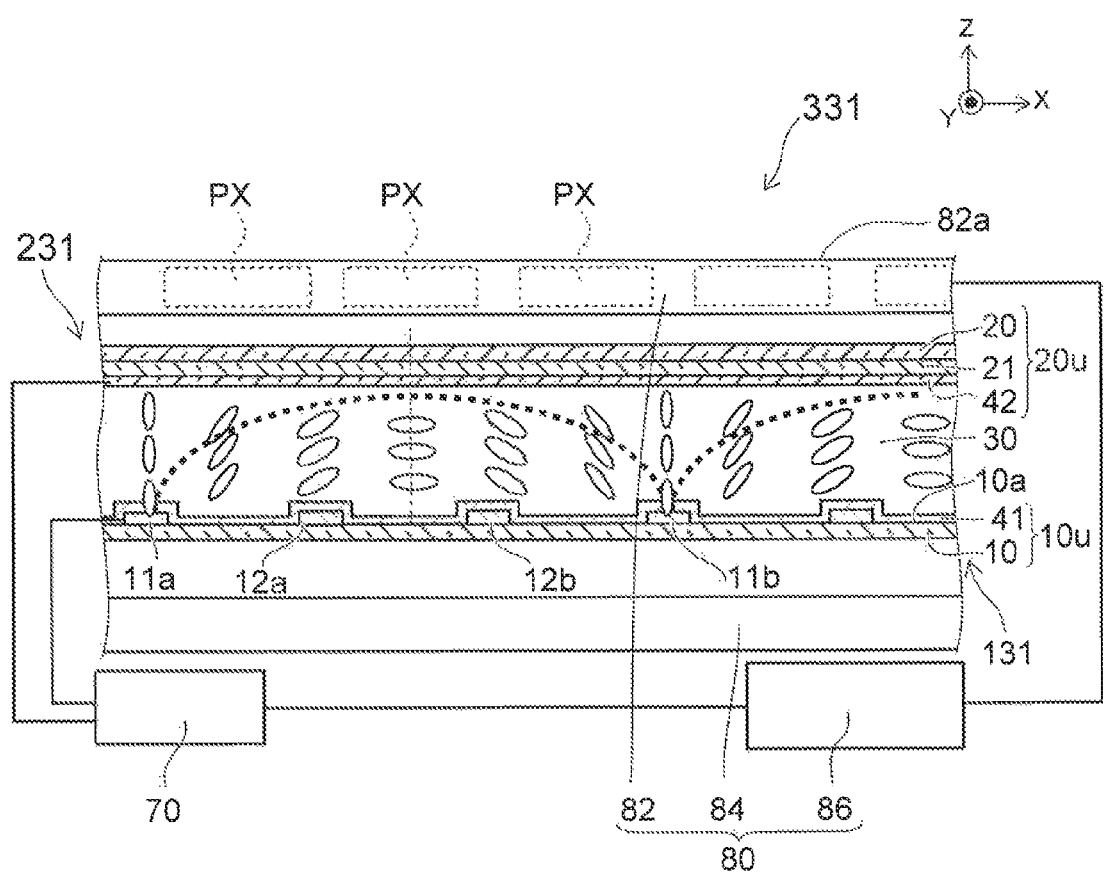
FIG. 5 is a sectional view schematically showing an image display device according to a third embodiment.

FIG. 5 is a sectional view schematically showing an image display device according to a third embodiment.

As shown in FIG. 5, in the image display device 331 and the liquid crystal lens device 231, the liquid crystal optical element 131 is provided between the display unit 82 and the light source unit 84. In the liquid crystal optical element 131, the light emitted from the light source unit 84 and transmitted through the liquid crystal optical element 131 is incident on the display unit 82.

Thus, the liquid crystal optical element 131 may be provided between the display unit 82 and the light source unit 84. In this example, the liquid crystal optical element 131 is substantially the same as the liquid crystal optical element 111 described in the above first embodiment. The liquid crystal optical element 131 is not limited thereto, but may have any of the configurations described in the first embodiment and the second embodiment.

In the above embodiments, the display unit 82 is a display device of the transmission type. The display unit 82 is not limited thereto, but may be a display device of the reflection type. In the case of using a display device of the reflection type for the display unit 82, the light source unit 84 may be omitted. In the case of using a display device of the reflection type for the display unit 82, for instance, a light source unit 84 of the front light type may be used. For instance, the liquid crystal optical element 131 may be provided on the display surface 82a of the display unit 82, and the light source unit 84 may be provided on the liquid crystal optical element 131.

The embodiments can provide a liquid crystal lens device having a high quality lens function. This liquid crystal lens device can be used to provide an image display device providing high quality display.

In this specification, "perpendicular" and "parallel" mean not only being exactly perpendicular and exactly parallel, but include e.g. variations in the manufacturing process, and only need to mean being substantially perpendicular and substantially parallel. In this specification, the state of being "provided on" includes not only the state of being provided in direct contact, but also the state of being provided with another element interposed in between. The state of being "stacked" includes not only the state of being stacked in contact with each other, but also the state of being stacked with another element interposed in between. The state of being "opposed" includes not only the state of directly facing, but also facing with another element interposed in between.

Hereinabove, embodiments of the invention are described with reference to specific examples. However, the embodiments of the invention are not limited to these specific examples. For example, one skilled in the art may similarly practice the invention by appropriately selecting specific configurations of components included in liquid crystal lens devices and image display devices such as drivers, display units, image display units, first substrate units, second substrate units, liquid crystal layers, first substrates, second substrates, first electrodes, second electrodes, first sub electrodes, second sub electrodes, center electrodes, opposite electrodes, etc., from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all liquid crystal lens devices and image display devices practicable by an appropriate design modification by one skilled in the art based on the liquid crystal lens devices and image display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and theft equivalents are intended to cover such forms or modifications as would fall within the scope and spirit of the invention.

What is claimed is:

1. A liquid crystal lens device comprising:
   a plurality of first electrodes extending in a first direction and arranged in a second direction crossing the first direction;
   a first sub electrode provided between a center in the second direction of two nearest ones of the first electrodes and one of the two nearest first electrodes;
   a second sub electrode provided between the center and the other of the two nearest first electrodes;
   an opposite electrode opposed to each of the first electrodes, the first sub electrode, and the second sub electrode; and
   a liquid crystal layer provided between the first electrodes and the opposite electrode, between the first sub electrode and the opposite electrode, and between the second sub electrode and the opposite electrode,
   a distance between the one of the two nearest first electrodes and the first sub electrode and a distance between the other of the two nearest first electrodes and the second sub electrode being longer than a distance between each of the first electrodes and the opposite electrode, and
   $V2/V1$ being less than or equal to $P2/P1$,
   where $V1$ is an absolute value of a potential difference between each of the first electrodes and the opposite electrode,
   $V2$ is an absolute value of a potential difference between the first sub electrode and the opposite electrode and between the second sub electrode and the opposite electrode,
   $P1$ is a distance between the two nearest first electrodes, and
   $P2$ is a distance between the first sub electrode and the second sub electrode.

2. The device according to claim 1, wherein electrodes provided between the two nearest first electrodes are only two electrodes that are the first sub electrode and the second sub electrode.

3. The device according to claim 1, further comprising:
   a central electrode provided at the center between the two nearest first electrodes.

4. The device according to claim 1, wherein the $V1$ is three times or more the $V2$.

5. The device according to claim 1, wherein the distance between the first sub electrode and the second sub electrode is half or less of the distance between the two nearest first electrodes.

6. The device according to claim 1, wherein the distance between the first sub electrode and the second sub electrode is less than or equal to the distance between the one of the two nearest first electrodes and the first sub electrode and the distance between the other of the two nearest first electrodes and the second sub electrode.

7. The device according to claim 1, wherein the distance between the first sub electrode and the second sub electrode is a quarter or less of the distance between the two nearest first electrodes.

8. The device according to claim 1, wherein the distance between the first sub electrode and the second sub electrode is half or more of the distance between each of the first electrodes and the opposite electrode.

9. The device according to claim 1, wherein a distance between each of the first electrodes and the liquid crystal layer, a distance between the first sub electrode and the liquid crystal layer, and a distance between the second sub electrode and the liquid crystal layer are 30 am or more and 300 am or less.

10. The device according to claim 1, further comprising:
    a driver electrically connected to each of the first electrodes, the first sub electrode, the second sub electrode, and the opposite electrode and configured to set a potential to each of the first electrodes, the first sub electrode, the second sub electrode, and the opposite electrode, the potential being such that $V2/V1$ is less than or equal to $P2/P1$.

11. The device according to claim 10, wherein the driver changes a refractive index distribution formed in the liquid crystal layer by switching between a state of setting the potential and a state of not setting the potential.

12. The device according to claim 1, further comprising:
    a first substrate having a first major surface; and
    a second substrate having a second major surface opposed to the first major surface,
    the first electrodes, the first sub electrode, and the second sub electrode being provided on the first major surface,
    the opposite electrode being provided on the second major surface, and
    the liquid crystal layer is provided between the first substrate and the second substrate.

13. The device according to claim 1, wherein the liquid crystal layer includes a liquid crystal material having a positive dielectric anisotropy.

14. The device according to claim 13, wherein an initial arrangement of the liquid crystal material is a horizontally oriented.

15. The device according to claim 1, wherein $(V2/V1)/(P2/P1)$ is 0.5 or more and 1 or less.

16. The device according to claim 1, wherein
    the $P1$ is 20 μm or more and 1000 μm or less,
    the $P2$ is 10 μm or more and 500 μm or less,
    the $V1$ is 3 V or more and 7 V or less, and
    the $V2$ is 0.5 V or more and 2.5 V or less.

17. An image display device comprising:
    a liquid crystal lens device including:
        a plurality of first electrodes extending in a first direction and arranged in a second direction crossing the first direction;
        a first sub electrode provided between a center in the second direction of two nearest ones of the first electrodes and one of the two nearest first electrodes;
        a second sub electrode provided between the center and the other of the two nearest first electrodes;
        an opposite electrode opposed to each of the first electrodes, the first sub electrode, and the second sub electrode; and
        a liquid crystal layer provided between the first electrodes and the opposite electrode, between the first sub electrode and the opposite electrode, and between the second sub electrode and the opposite electrode; and an image display unit stacked with the liquid crystal lens device in a third direction crossing the first direction and the second direction and including a display unit configured to output a light including image information, a distance between the one of the two nearest first electrodes and the first sub electrode and a distance between the other of the two nearest first electrodes and the second sub electrode being longer than a distance between each of the first electrodes and the opposite electrode, and V2/V1 being less than or equal to P2/P1, where V1 is an absolute value of a potential difference between each of the first electrodes and the opposite electrode, V2 is an absolute value of a potential difference between the first sub electrode and the opposite electrode and between the second sub electrode and the opposite electrode, P1 is a distance between the two nearest first electrodes, and P2 is a distance between the first sub electrode and the second sub electrode.

18. The device according to claim 17, wherein
the display unit includes a plurality of pixels arranged in the second direction, and
a region between the two nearest first electrodes overlaps the pixels in the third direction.

19. The device according to claim 17, wherein
the image display unit further includes a light source unit configured to emit a light toward the display unit, and
the display unit is provided between the liquid crystal lens device and the light source unit.

20. The device according to claim 17, wherein
the image display unit further includes a light source unit configured to emit a light toward the display unit, and
the liquid crystal lens device is provided between the display unit and the light source unit.

* * * * *